(12) United States Patent
Bärenzung et al.

(10) Patent No.: US 11,182,824 B2
(45) Date of Patent: Nov. 23, 2021

(54) SYSTEM AND METHOD FOR PROVIDING ADVERTISING CONSISTENCY

(71) Applicant: OpenTV, Inc., San Francisco, CA (US)

(72) Inventors: Eric Bärenzung, Prévessin-Moens (FR); John Tinsman, Fallbrook, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 16/433,692

(22) Filed: Jun. 6, 2019

(65) Prior Publication Data
US 2020/0027123 A1  Jan. 23, 2020

Related U.S. Application Data

(63) Continuation of application No. 13/913,073, filed on Jun. 7, 2013, now abandoned.

(51) Int. Cl.
*G06Q 30/00* (2012.01)
*G06Q 30/02* (2012.01)

(52) U.S. Cl.
CPC .............................. *G06Q 30/0251* (2013.01)

(58) Field of Classification Search
CPC .................................................. G06Q 30/0251
See application file for complete search history.

(56) References Cited

U.S. PATENT DOCUMENTS

| | | |
|---|---|---|
| 5,592,611 A | 1/1997 | Midgely et al. |
| 5,825,884 A | 10/1998 | Zdepski et al. |
| 6,185,619 B1 | 2/2001 | Joffe et al. |
| 6,219,692 B1 | 4/2001 | Stiles |
| 6,223,209 B1 | 4/2001 | Watson |
| 6,298,373 B1 | 10/2001 | Burns et al. |
| 6,370,580 B2 | 4/2002 | Kriegsman |
| 7,240,092 B2 | 7/2007 | Houghton et al. |
| 8,195,508 B1 | 6/2012 | Calder et al. |
| 8,249,918 B1 | 8/2012 | Biere et al. |

(Continued)

FOREIGN PATENT DOCUMENTS

| | | |
|---|---|---|
| CN | 101599155 A | 12/2009 |
| CN | 102625982 A | 8/2012 |

(Continued)

OTHER PUBLICATIONS

101 NPLs.*

(Continued)

*Primary Examiner* — Azam A Ansari
*Assistant Examiner* — Michael I Ezewoko
(74) *Attorney, Agent, or Firm* — Schwegman, Lundberg & Woessner, P.A.

(57) ABSTRACT

In example embodiments, a system and method for providing advertising consistency is provided. In example embodiments, identifying information for a primary advertisement that is presented on a primary device is received. A secondary advertisement that is consistent with the primary advertisement is determined. The secondary advertisement is to be presented on a secondary device at a same time that the primary advertisement is presented on the primary device. The secondary advertisement is provided to the secondary device.

20 Claims, 8 Drawing Sheets

(56) References Cited

U.S. PATENT DOCUMENTS

| | | | |
|---|---|---|---|
| 8,666,528 B2* | 3/2014 | Harkness | H04N 21/25891 700/94 |
| 8,683,502 B2 | 3/2014 | Shkedi et al. | |
| 8,917,971 B2 | 12/2014 | Woods et al. | |
| 8,966,512 B2 | 2/2015 | Sivertsen | |
| 9,483,499 B2 | 11/2016 | Ramanujapuram et al. | |
| 9,578,366 B2* | 2/2017 | Baum | H04N 21/4307 |
| 2006/0271947 A1 | 11/2006 | Lienhart et al. | |
| 2007/0112630 A1 | 5/2007 | Lau et al. | |
| 2010/0280641 A1 | 11/2010 | Harkness et al. | |
| 2011/0069937 A1 | 3/2011 | Toerner | |
| 2011/0191189 A1 | 8/2011 | Baiz Matuk | |
| 2012/0265595 A1 | 10/2012 | Corner et al. | |
| 2013/0054433 A1 | 2/2013 | Giard et al. | |
| 2013/0097008 A1 | 4/2013 | Kaniel | |
| 2013/0124309 A1 | 5/2013 | Traasdahl et al. | |
| 2013/0347018 A1 | 12/2013 | Limp et al. | |
| 2014/0282677 A1* | 9/2014 | Mantell | H04N 21/4784 725/23 |
| 2014/0365299 A1 | 12/2014 | Bärenzung et al. | |

FOREIGN PATENT DOCUMENTS

| | | |
|---|---|---|
| CN | 102696223 A | 9/2012 |
| CN | 102831537 A | 12/2012 |
| CN | 105453123 A | 3/2016 |
| EP | 3005269 | 4/2016 |
| WO | 2010054222 | 5/2010 |
| WO | WO-2014197734 A2 | 12/2014 |
| WO | WO-2014197734 A3 | 12/2014 |

OTHER PUBLICATIONS

Proquest NPLs.*
U.S. Appl. No. 13/913,073, filed Jun. 7, 2013, System and Method for Providing Advertising Consistency.
"U.S. Appl. No. 13/913,073, Examiner Interview Summary dated Oct. 19, 2017", 3 pgs.
"U.S. Appl. No. 13/913,073, Final Office Action dated Jan. 7, 2019", 18 pgs.
"U.S. Appl. No. 13/913,073, Final Office Action dated Apr. 13, 2016", 21 pgs.
"U.S. Appl. No. 13/913,073, Final Office Action dated Jun. 29, 2017", 13 pgs.
"U.S. Appl. No. 13/913,073, Non Final Office Action dated Jun. 13, 2018", 19 pgs.
"U.S. Appl. No. 13/913,073, Non Final Office Action dated Sep. 11, 2015", 49 pgs.
"U.S. Appl. No. 13/913,073, Non Final Office Action dated Dec. 16, 2016", 31 pgs.
"U.S. Appl. No. 13/913,073, Response filed Apr. 17, 2017 to Non Final Office Action dated Dec. 16, 2016", 21 pgs.
"U.S. Appl. No. 13/913,073, Response filed Jul. 13, 2016 to Final Office Action dated Apr. 13, 2016", 14 pgs.
"U.S. Appl. No. 13/913,073, Response filed Sep. 28, 2017 to Final Office Action dated Jun. 29, 2017", 9 pgs.
"U.S. Appl. No. 13/913,073, Response filed Oct. 15, 2018 to Non Final Office Action dated Jun. 13, 2018", 13 pgs.
"U.S. Appl. No. 13/913,073. Response filed Feb. 11, 2016 to Non Final Office Action dated Sep. 11, 2015", 18 pgs.
"Australian Application Serial No. 2014274826, First Examination Report dated Mar. 20, 2019", 4 pgs.
"Brazil Application Serial No. BR1120150306594, Office Action dated Nov. 6, 2018", 2 pgs.
"Britannica Concise Encyclopedia", Encyclopedia Britannica, (2006), p. 537.
"Chinese Application Serial No. 201480044145.X, Office Action dated May 13, 2019", With English translation, 23 pgs.
"Chinese Application Serial No. 201480044145.X, Office Action dated Nov. 2, 2018", w/English Translated Summary, 16 pages.
"Chinese Application Serial No. 201480044145.X, Response filed Mar. 14, 2019 to Office Action dated Nov. 2, 2018", w/English Claims, 56 pgs.
"European Application Serial No. 14807376.0, Extended European Search Report dated Nov. 28, 2016", 6 pgs.
"European Application Serial No. 14807376.0, Response to Extended European Search Report dated Jun. 26, 2017", 12 pgs.
"International Application Serial No. PCT/US2014/041163, International Preliminary Report on Patentability dated Dec. 17, 2015", 7 pgs.
"International Application Serial No. PCT/US2014/041163, International Search Report dated Apr. 13, 2015", 2 pgs.
"International Application Serial No. PCT/US2014/041163, Written Opinion dated Apr. 13, 2015", 5 pgs.
"Microsoft Computer Dictionary", Fifth Edition, Microsoft Press, (2002), 23 pgs.
"Streetlights and Shadows", MIT Press, (2009), 33-47.
"The future of the internet—and how to stop It", Yale University Press, Chapter(s) 1-9, (2008), 11-18.
Baum, Eric, "What is Thought", The MIT Press, (2004), 33-65.
Burgard, Wolfram, et al., "Robotics, Science and Systems III", The MIT Press, (2008), 41-48 pgs.
Chomsky, "Language and Mind", Oxford University Press, (2005), 62 pgs.
Edelman, Shimon, "Computing the Mind", Oxford University Press, (2008), 26-31 pgs.
Goffman, Erving, "Frame Analysis", Northeastern University Press, (1974), 1-39, 301-344.
Gupta, Naresh, "Getting the Hands Wet", Inside Bluetooth Low Energy, Artech House, (2013), 119-130.
Krader, Lawrence, "Noetics", Peter Lang Publishing, (2010), 551-553.
Lakoff, George, et al., "Metaphors We Live By", University of Chicago Press, (1980), ix-55.
Searle, John R, "Mind—A Brief Introduction", Oxford University Press, (2004), 62-67.
Wirth, Niklaus, "Algorithms + Data Structures = Programs", (1976), xii-55 pgs.
Zbigniew, Michalawicz, "Genetic Algorithms + Data Structures = Evolution Programs", Springer-Verlag, (1976), 1-3.
"Chinese Application Serial No. 201480044145.X, Decision of Rejection dated Nov. 6, 2019", with English translation, 14 pages.
"Australian Application Serial No. 2014274826, Response filed Dec. 20, 2019 to First Examination Report dated Mar. 20, 2019", 56 pgs.
"Australian Application Serial No. 2014274826, Subsequent Examiners Report dated Jan. 8, 2020", 4 pgs.
"Chinese Application Serial No. 201480044145.X, Response filed Sep. 26, 2019 to Office Action dated May 13, 2019", with English claims, 29 pages.
"Brazil Application Serial No. BR1120150306594, Office Action dated Feb. 18, 2020", with English translation, 8 pages.
"Australian Application Serial No. 2014274826, Response filed Mar. 6, 2020 to Subsequent Examiners Report dated Aug. 31, 2020", 69 pgs.
"Australian Application Serial No. 2014274826, Subsequent Examiners Report dated Mar. 20, 2020", 3 pgs.
"European Application Serial No. 14807376.0, Communication Pursuant to Article 94(3) EPC dated Apr. 14, 2020", 9 pgs.
"Brazil Application Serial No. BR1120150306594, Response filed Jun. 4, 2020 to Office Action dated Feb. 18, 2020", with English claims, 44 pages.
"Canadian Application Serial No. 2,914,710, Office Action dated Jun. 29, 2020", 5 pgs.
Jian-Quan, Ouyang, "Fusing audio-visual fingerprint to detect TV commercial advertisement", Computers and Electrical Engineering, Pergamon Press, GB, vol. 37, No. 6, (Aug. 18, 2011), pp. 991-1008.
"Australian Application Serial No. 2020202033, First Examination Report dated Mar. 9, 2021", 4 pages.
"Canadian Application Serial No. 2,914,710, Office Action dated Mar. 29, 2021", 6 pages.
"Canadian Application Serial No. 2,914,710, Response filed Oct. 28, 2020 to Office Action dated Jun. 29, 2020", 22 pgs.

(56) References Cited

OTHER PUBLICATIONS

"Chinese Application Serial No. 201480044145.X, Notice of Reexamination dated Sep. 29, 2021", with machine English translation, 12 pages.

Canadian Application Serial No. 2,914,710, Response filed Jul. 19, 2021 to Office Action dated Mar. 29, 2021, with English claims, 26 pages.

* cited by examiner

SYSTEM AND METHOD FOR PROVIDING ADVERTISING CONSISTENCY

CLAIM OF PRIORITY

This application is a continuation of U.S. patent application Ser. No. 13/913,073, filed on Jun. 7, 2013, which is incorporated herein by reference in its entirety.

FIELD

The present disclosure relates generally to digital content, and in a specific example embodiment, to providing advertising consistency.

BACKGROUND

Conventionally, when a user is watching something on a primary device while operating a secondary device, the two devices are not coordinated in what they display. This may be undesirable to an advertiser if, while their advertisement is displaying on the primary device, a competitor's advertisement is displaying at roughly the same time on the secondary device.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for providing advertising consistency between two devices. The two devices (a primary device and a secondary device) may be the same device or be embodied within a single machine (e.g., an Internet TV displaying a primary advertisement in a main section and a secondary advertisement in secondary section such as in a banner area, in a second display area, or in an overlay over the main section) or be located in two separate machines (e.g., a television and a tablet). In one embodiment, advertising consistency may comprise having the primary advertisement presented on the primary device and the secondary advertisement presented on the secondary device not be in conflict with each other. For example, if a BMW advertisement is being presented on the primary device, a Mercedes advertisement should not be presented on the secondary device. In another embodiment, advertising consistency comprises having the secondary advertisement coordinate or compliment the primary advertisement. For example, if a national BMW advertisement is presented on the primary device, the secondary device may present a local BMW dealer advertisement or an advertisement for a car wash or auto part store. In some embodiments, the advertisement may include interactive advertisements.

Accordingly in example embodiments, identifying information for a primary advertisement that is presented on a primary device is received. A secondary advertisement that is consistent with the primary advertisement is determined. The secondary advertisement is provided to a secondary device for presentation at roughly a same time (e.g., where there is some overlap in timing of the presentation of the primary advertisement and the secondary advertisement) that the primary advertisement is presented on the primary device.

Figure 1:
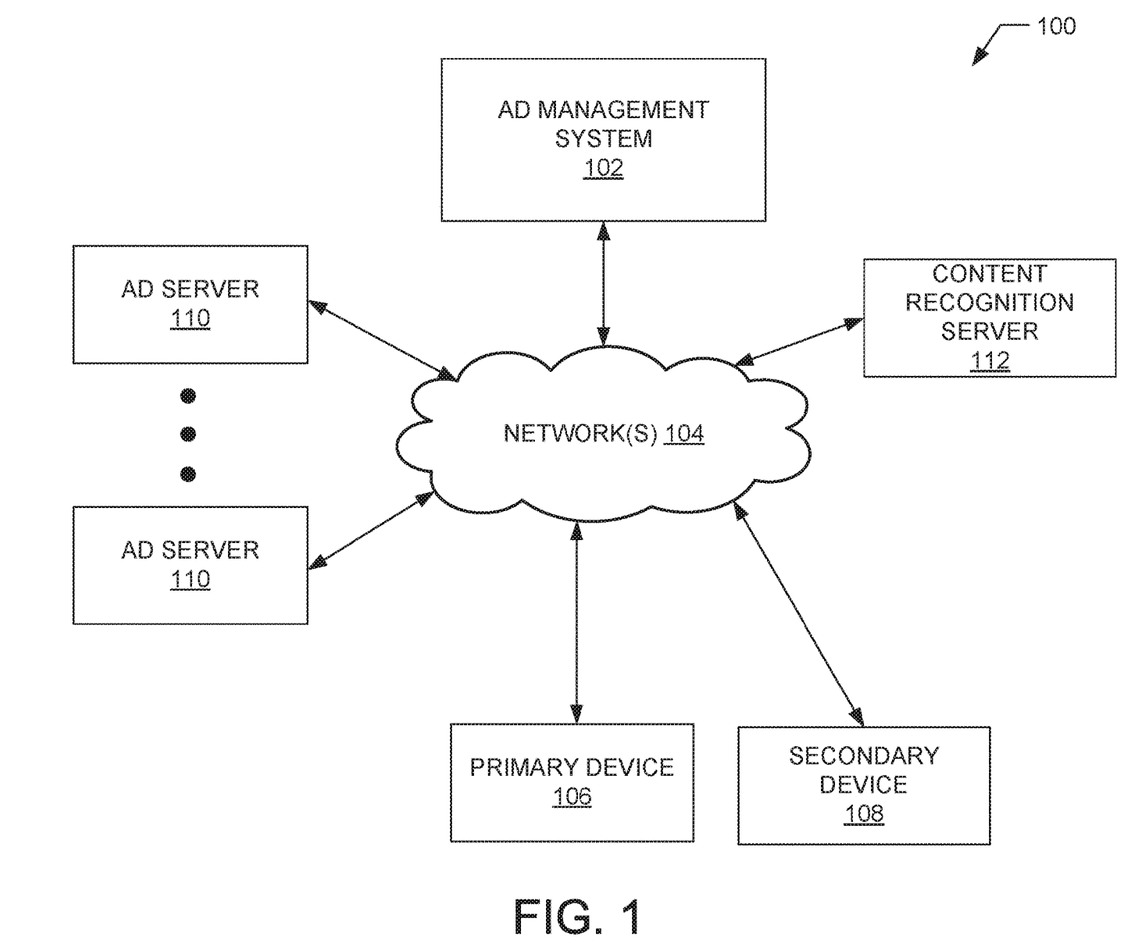
FIG. 1 is a diagram illustrating an example environment in which embodiments of a system for providing advertising consistency may be implemented.

With reference to FIG. 1, a diagram illustrating an example environment 100 in which embodiments of a system for providing advertising consistency between two devices is shown. The environment 100 comprises an ad management system 102 coupled via a communication network 104 (e.g., cable network, over-air-broadcast network, the Internet, wireless network, cellular network, satellite network, or a Wide Area Network (WAN)) to a primary device 106 and a secondary device 108. The primary device 106 and the secondary device 108 may be embodied within one machine (or be the same device) or be located in two separate machines. As such, the primary device 106 and the secondary device 108 may comprise a television, mobile phone, laptop, tablet, radio, or any other communication device that a user may utilize to access content. In some embodiments, the primary device and/or the secondary device may be communicatively coupled to a set-top box that, in turn, is communicatively coupled to a broadcasting network (e.g., cable network, over-air-broadcast network, satellite network, the Internet).

The ad management system 102 manages provisioning of the secondary advertisement to the secondary device 108. In example embodiments, the ad management system 102 may determine non-conflicting advertisements or complementary advertisements and instructs coupled ad servers 110 to provide the secondary advertisements to the secondary device 108. The secondary advertisement may be provided directly from the ad server 110 or via the ad management system 102. The ad management system 102 will be discussed in more detail in connection with FIG. 2.

In some embodiments, the ad management system 102 identifies the primary advertisement that is being presented on the primary device 106. In these embodiments, the ad management system 102 may communicate with a content recognition server 112 to identify the primary advertisement based on identifying information received from the secondary device 108. In some instances, the identifying information may comprise a fingerprint of audio or visual images of the primary advertisement that has been captured by the secondary device 108. The fingerprint is an electronic digest of some segment of the content in the primary advertisement that provides some characteristics of the primary advertisement. The content recognition server 112 includes a database of commonly occurring advertisements against which the fingerprint may be compared to identify the primary advertisement. In other embodiments, the primary advertisement may be identified using identifying information obtained from the primary device 106 or the set-top-box, for example.

It is noted that the environment 100 shown in FIG. 1 is exemplary. For example alternative embodiments may comprise any number of ad servers 110. In another example, the functionalities of the content recognition server 112 may be incorporated into the ad management system 102 thus eliminating the need for a separate content recognition server 112. Further still, more than one secondary device may be provided in the environment 100. In these cases, consistency may be coordinated across the plurality of secondary devices.

Figure 2:
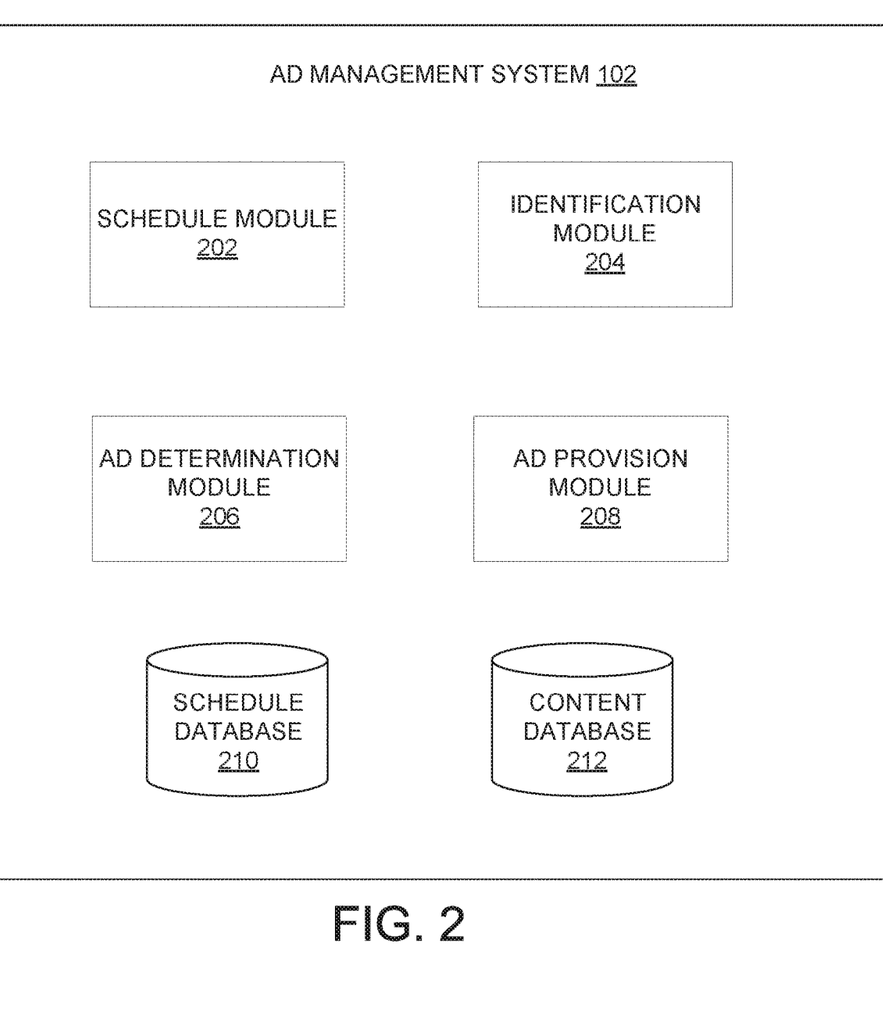
FIG. 2 is a block diagram illustrating an example embodiment of an ad management system.

Referring now to FIG. 2, a block diagram illustrating an example embodiment of the ad management system 102 is shown. The ad management system 102 receives a request from the secondary device 108 and provides (or instructs the ad server 110 to provide) a secondary advertisement that is either non-conflicting or complementary to a primary advertisement being presented on a primary device 106. In example embodiments, the request may comprise identifying information of the primary advertisement that is captured by the secondary device 108. To enable this, the ad management system 102 comprises a schedule module 202, an identification module 204, an ad determination module 206, and an ad provision module 208 which may be all communicatively coupled together.

The schedule module 202 manages the identification of the primary advertisement based on an ad schedule. Accordingly the schedule module 202 may access a schedule database 210. In some embodiments, the ad schedule will indicate when ad breaks will occur, but may not explicitly indicate the actual advertisement that is to be presented. In these cases, the identification process associated with the identification module 204 may be used. In other embodiments, the ad schedule may identify the actual advertisement that is to be presented during a particular ad break. In these embodiments, the identification process of the identification module 204 may not be needed. Additionally, these embodiments allow for a predetermination of the secondary advertisements to be provisioned during each ad break to coincide with corresponding primary advertisements. While example embodiments show the schedule database 210 in the ad management system 102, alternatively, the schedule module 202 may access an external schedule database or communicate with a server that manages advertisement schedules (e.g., a broadcast network server).

The identification module 204 manages the identification of the primary advertisement using identifying information or metadata associated with the primary advertisement. In some embodiments, the identification module 204 may communicate with an external content recognition server 112 to determine the identity of the primary advertisement using content recognition information received from the secondary device 108.

In other embodiments, the identification module 204 may perform the identification of the primary advertisement, itself, by accessing a content database 212 that stores identifying information for known primary advertisements. Using the identifying information (e.g., audio or visual fingerprint) received from the secondary device 108, for example, the identification module 204 compares the identifying information with content in the content database 212 to find a match (e.g., an advertisement that matches the identifying information). In another example, the identification module 204 may use other forms of metadata associated with the primary advertisement to find a match in the content database 212. It is noted that the content database 212 may be located external to the ad management system 102 in alternative embodiments.

The ad determination module 206 manages the determination of the secondary advertisement. In some embodiments, the ad determination module 206 may determine a category or genre of the secondary advertisement after the primary advertisement has been identified by the identification module 204. For example, the primary advertisement may be identified as a car brand advertisement. If a non-conflicting advertisement is desired, then the ad determination module 206 may determine that the secondary advertisement should not be in the car brand advertisement category. Alternatively, if a complementary advertisement is desired, the ad determination module 206 may determine that a car supplementary category (e.g., car wash, car part store) is appropriate.

In another instance, the primary advertisement may be exactly identified (e.g., a national BMW advertisement). In these cases, a complementary advertisement, for example, may be determined to be a local version of the advertisement (e.g., local BMW dealer) or an advertisement for a supplemental item (e.g., local car wash). In some cases, the secondary advertisement may comprise a coupon (e.g., a coupon for the local car wash). Once a secondary advertisement category or genre or an exact advertisement is identified (collectively referred to as "secondary advertisement identity"), the ad determination module 206 may provide the secondary advertisement identity to the ad provision module 208.

The ad provision module 208 manages the provisioning of the secondary advertisement. Thus, the ad provision module 208 may communicate the second advertisement identity to the ad server 110 and request the secondary advertisement. In some cases, the ad provision module 208 may instruct the ad server 110 to provide the secondary advertisement directly to the secondary device 108.

In other embodiments, the ad provision module 208 may retrieve the secondary advertisement from the ad server 110 and provide the secondary advertisement to the secondary device 108. In these cases, the ad management system 102 may verify that the secondary advertisement is non-conflicting or complementary prior to forwarding the secondary advertisement to the secondary device 108. For example, the ad determination module 206 may check to insure that the secondary advertisement is either non-conflicting or complementary to the primary advertisement. It is noted that the determination of whether to provide a non-conflicting or a complementary advertisement may be predetermined or set by an ad management application that is running on the secondary device 108 in accordance with some embodiments.

Figure 3:
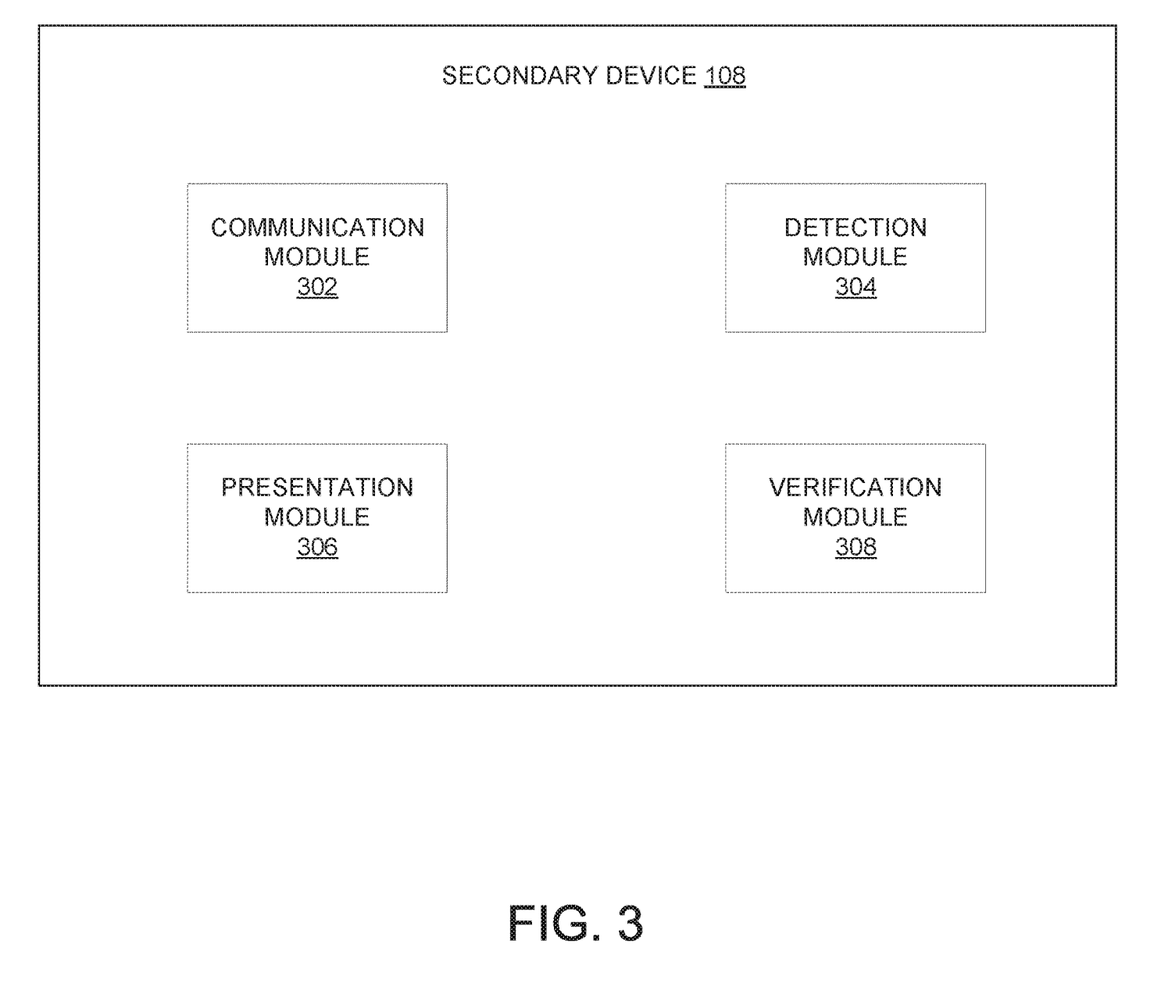
FIG. 3 is a block diagram illustrating an example embodiment of a secondary device.

FIG. 3 is a block diagram illustrating an example embodiment of the secondary device 108. In example embodiments, the secondary device 108 may detect identifying information associated with the primary advertisement and send a request for a secondary advertisement along with the identifying information. Accordingly, the secondary device 108 comprises an ad management application that attempts to coordinate the viewing of the secondary advertisement to the primary advertisement. The ad management application may be provided (e.g., downloaded) from the ad management system 102. In example embodiments, the ad management application may provide or be communicatively coupled to a communication module 302, a detection module 304, and a presentation module 306. In some embodiments, the secondary device 108 may verify whether the secondary advertisement is non-conflicting or complementary. In these cases, the ad management application may further provide or be communicatively coupled to a verification module 308.

The communication module 302 manages communications with other devices or components coupled to the network 104. As such, the communication module 302 may send a request and/or identifying information of the primary advertisement to the ad management system 102. In some cases, the communication module 302 may also receive the secondary advertisement from the ad server 110 or the ad management system 102.

The detection module 304 manages the detection of identifying information (or characteristics) of the primary advertisement that is being presented on the primary device 106. In some embodiments, the detection module 304 may comprise or be coupled to a microphone or an image capture device that captures identifying information in the form of a fingerprint of the primary advertisement. It is noted that in various embodiments the detection module 304 may detect any characteristic or metadata of the primary advertisement. The identifying information is then provided by the communication module 302 to the ad management system 102.

In embodiments where the secondary device 108 comprises (or is coupled to) a database of common advertisements, the secondary device 108 may comprise a local content recognition module. The local content recognition module may then determine the identity of the primary advertisement. Once identified, the secondary device 108 may send the identifying information (e.g., the identified advertisement or a category/genre of the identified advertisement) to the ad management system 102 as a request for the secondary advertisement.

The presentation module 306 presents the secondary advertisement that is received via the communication module 302. According to some embodiments, the received secondary advertisement may be verified by the secondary device 108 prior to presentation (e.g., when the secondary advertisement is received directly from the ad server 110). In these embodiments, the verification module 308 performs a check on the secondary advertisement similar to the process performed by the ad management system 102) to insure that the secondary advertisement is in compliance with the settings of the ad management application to either provide the non-conflicting advertisement or the complementary advertisement. The settings may be preset by the ad management system 102 or be set by the user of the secondary device 108, for example.

While example embodiments discuss the provisioning of a secondary advertisement that is consistent with the primary advertisement being presented on the primary device 106, alternative embodiments may contemplate receiving and presenting complimentary materials during a program (e.g., television show, movie) on the secondary device 108. For example, a fingerprint of the program may be captured by the secondary device 108 and used to identify the program. Then, complementary materials such as an advertisement for an item identified in the program may be provided on the secondary device 108.

Figure 4:
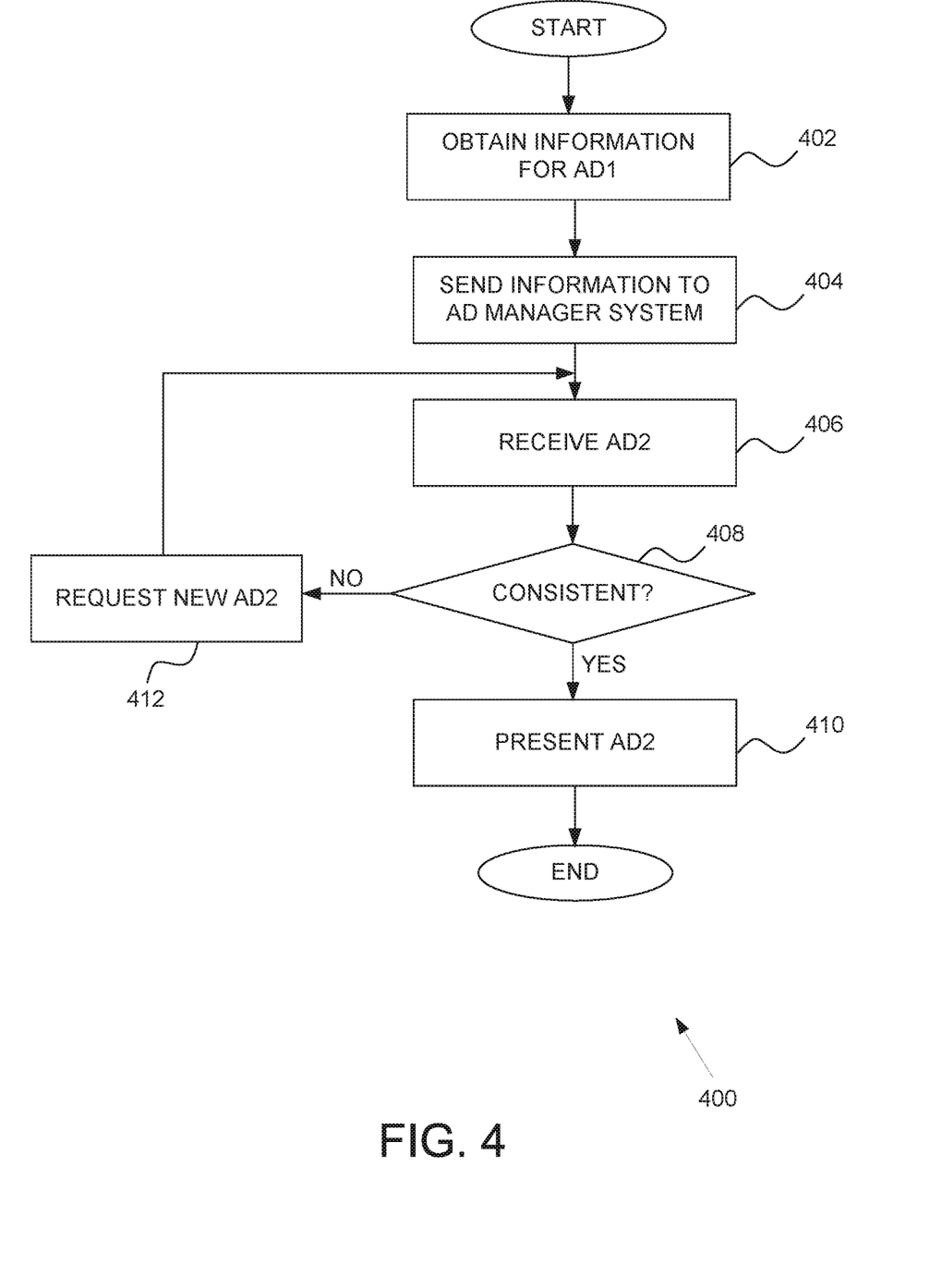
FIG. 4 is a flow diagram of an example method for providing consistent advertisements at the secondary device.

FIG. 4 is a flow diagram of an example a method 400 for providing non-conflicting advertisements at the secondary device 108. In operation 402, identifying information for the primary advertisement (also referred to as "AD1") is obtained. The identifying information may comprise an audio or visual fingerprint or metadata captured by the detection module 304.

The identifying information is sent to the ad management system 102 in operation 404. In example embodiments, the identifying information is sent as part of an ad request by the communication module 302. Alternatively, the sending of the identifying information may be automatically deemed to be an ad request by the ad management system 102. In cases where the secondary device 108 has functionality to determine the identity of the primary advertisement, the identifying information may comprise the identity of the primary advertisement or a corresponding category or genre for the primary advertisement.

In operation 406, the secondary device 108 receives the secondary advertisement (also referred to as "AD2"). The secondary advertisement may be received directly from the ad server 110 or be received via the ad management system 102. In some embodiments, the received secondary advertisement may be verified to insure that it is non-conflicting with the primary advertisement (e.g., in cases where the secondary advertisement is received directly from the ad server 110). In these embodiments, a verification process is performed in operation 408 by the verification module 308 to determine if the secondary advertisement is consistent with the primary advertisement (e.g., non-conflicting or complementary). If the secondary advertisement is consistent with the primary advertisement, then the secondary advertisement is presented in operation 410. However, if the secondary advertisement is not consistent with the primary advertisement, then in operation 412, a request may be sent to the ad management system 102 for a new secondary advertisement.

Figure 5:
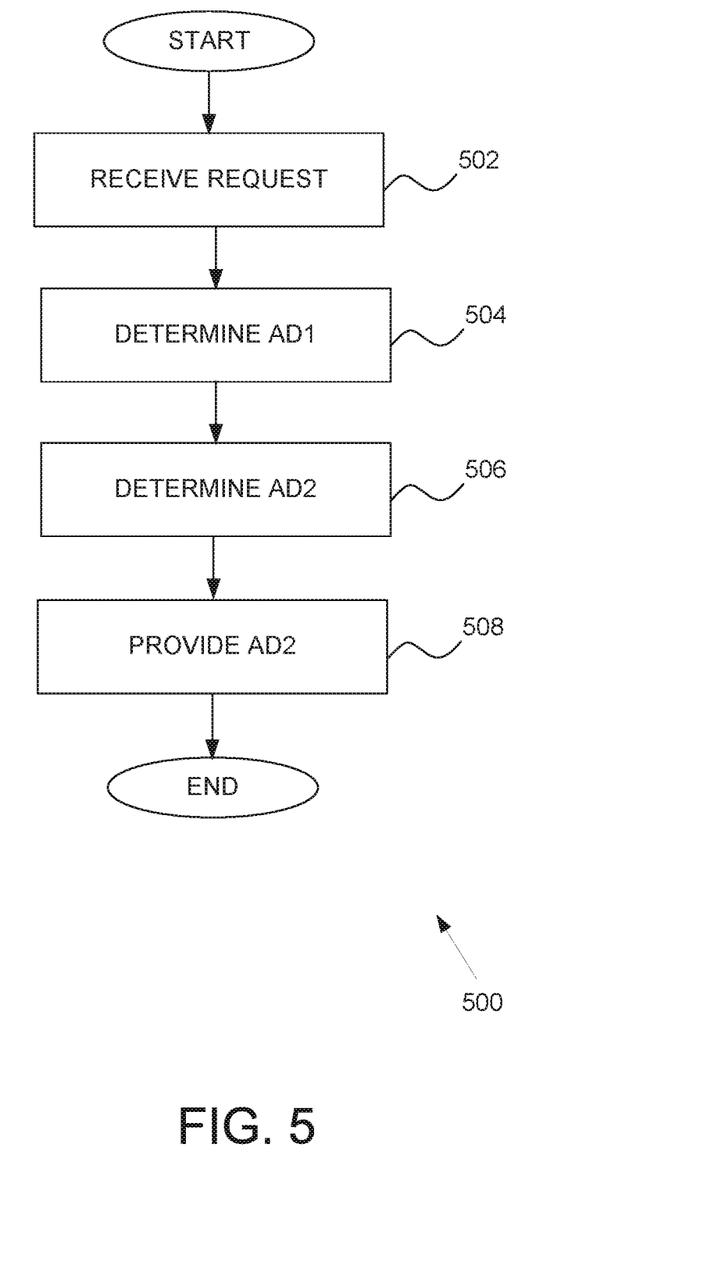
FIG. 5 is a flow diagram of an example method for provisioning a secondary advertisement by the ad management system.

FIG. 5 is a flow diagram of an example method 500 for provisioning the secondary advertisement by the ad management system 102. In operation 502, the ad management system 102 receives a request for the secondary advertisement. In some embodiments, the request comprises identifying information that has been captured by the secondary device 108, which may be used to identify the primary advertisement. In other embodiments, the identifying information may explicitly identify the actual primary advertisement or a category of the primary advertisement.

In optional operation 504, the primary advertisement is identified. In some embodiments, the identification module 204 may communicate with an external content recognition server 112 to determine the identity of the primary advertisement using identifying information received from the secondary device 108. In other embodiments, the identification module 204 may perform the identification of the primary advertisement by accessing the content database 212. Using the identifying information (e.g., fingerprint of the primary advertisement) received from the secondary device 108, for example, the identification module 204 compares the fingerprint with known advertisements in the content database 212 to find a match (e.g., an advertisement that matches the fingerprint). In these embodiments, the primary advertisement may be exactly identified (e.g., a national BMW advertisement) or a category that corresponds to the primary advertisement is identified.

In other embodiments, the primary advertisement may be identified based on an ad schedule. In some instances, the ad schedule may identify the actual advertisement that is to be presented during a particular ad break. In these embodiments, the identification process discussed above may not be needed. Additionally, the secondary advertisements may be determined in advance based on the known advertisements in the ad schedule. In other instances, the ad schedule merely indicates when ad breaks will occur, and the secondary device 108 may still capture identifying information at a predetermined time that corresponds to the ad schedule. In further embodiments, the primary advertisement may be identified using identifying information or metadata obtained from the primary device 106 or the set-top-box, for example.

In operation 506, the secondary advertisement is determined. In some embodiments, the ad determination module 206 may determine a category or genre of the secondary advertisement based on the identifying information corresponding to the primary advertisement or based on the ad schedule. A non-conflicting or complementary advertisement is then identified based on secondary advertisement settings (e.g., at the secondary device, predetermined by the ad management system 102, as set by the user).

In operation 508, the secondary advertisement is provided by the ad management system 102. In some cases, the ad provision module 208 may instruct the ad server 110 to provide the secondary advertisement directly to the secondary device 108. In other embodiments, the ad provision module 208 may retrieve the secondary advertisement from the ad server 110 and provide the secondary advertisement to the secondary device 108. In these cases, the ad management system 102 may verify that the secondary advertisement is non-conflicting or complementary prior to forwarding the secondary advertisement to the secondary device 108.

Figure 6A:
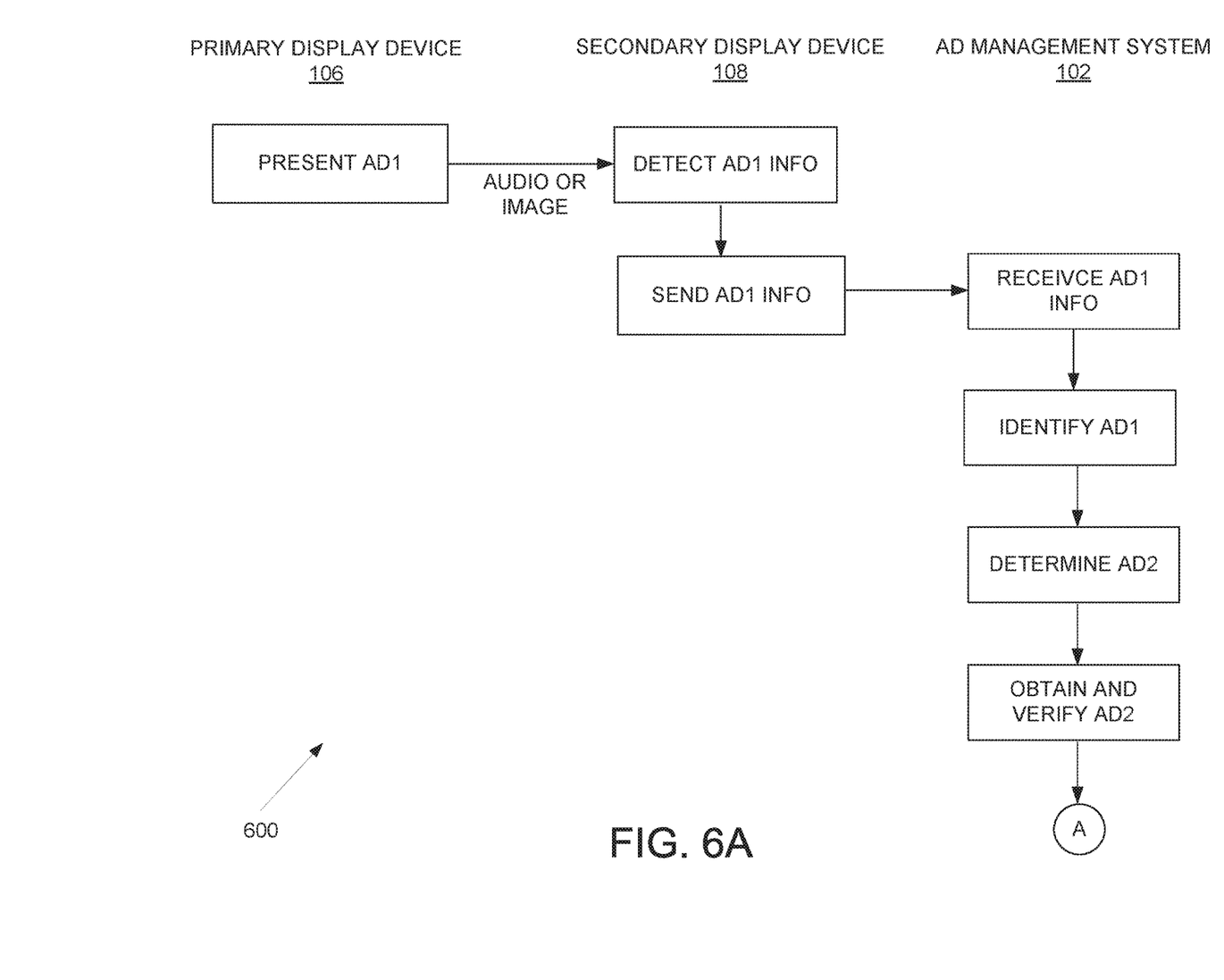
FIGS. 6A and 6B are communication flow diagrams of an example method providing advertisement consistency.
Figure 6B:
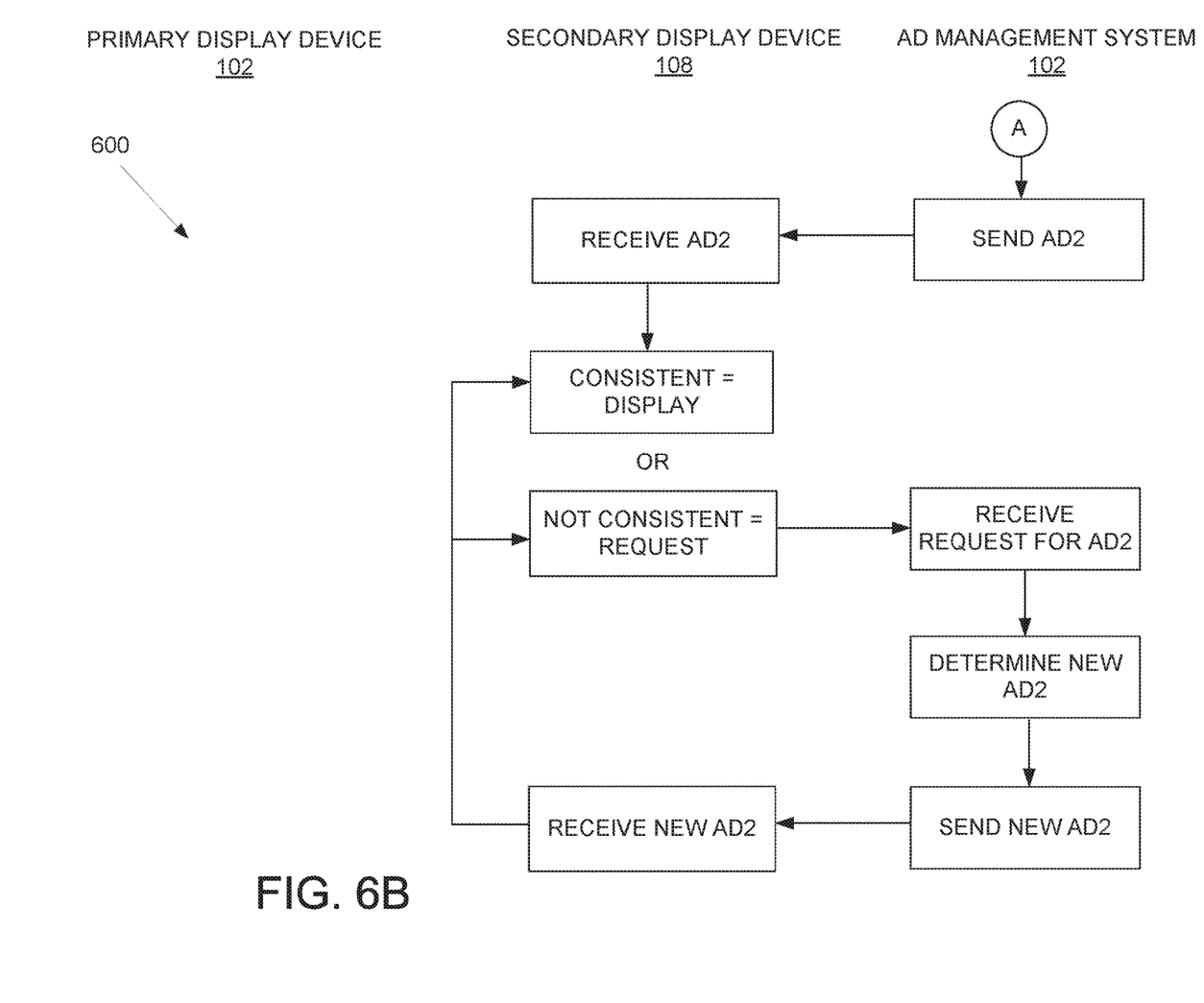

FIGS. 6A and 6B are communication flow diagrams of an example method 600 for providing advertisement consistency in the form of either a non-conflicting secondary advertisement or a complementary secondary advertisement for presentation on the secondary device 108. Initially, the primary device 106 presents the primary advertisement. For example, a television or a radio may present an advertisement for Coke. The secondary device 108 detects identifying information (e.g., audio or image fingerprint) for the primary advertisement. In some embodiments, the identifying information may comprise an identity of the primary advertisement (e.g., based on the secondary device 108 having functionalities to determine the identity). The identifying information is sent to the ad management system 102, which receives the identifying information and, in some cases, determines the identity of the primary advertisement. The identifying information of the primary advertisement may identify the actual advertisement that is being presented on the primary device 106 and/or a category or genre of the primary advertisement.

Once the primary advertisement is identified, the secondary advertisement may be determined. The secondary advertisement should either be non-conflicting with the primary advertisement (e.g., be in a different ad category) or complementary with the primary advertisement (e.g., be in a supplemental ad category or be a local version of a national advertisement). In some embodiments, the ad management system 102 obtains the secondary advertisement from the ad server 110. In alternative embodiments, the ad server 110 may serve the secondary advertisement directly to the secondary device 108. If the ad management system 102 obtains the secondary advertisement, the ad management system 102 verifies that the secondary advertisement is consistent with the primary advertisement prior to sending the secondary advertisement to the secondary device 108.

In some embodiments, the secondary device 108 may perform a verification to insure that the secondary advertisement is consistent with the primary advertisement prior to presenting the secondary advertisement. For example, if the secondary advertisement was received directly from the ad server 110 (e.g., not subject to the verification process performed by the ad management system 102), the secondary device 108 may perform the verification process. If the secondary advertisement is consistent, then the secondary advertisement is presented on the secondary device 108.

However, if the secondary advertisement is not consistent with the primary advertisement, then the secondary device 108 sends a request for another secondary advertisement to the ad management system 102. The ad management system 102 determines and/or requests a new secondary advertisement from the ad server 110 and provides the new advertisement to the secondary device 108.

Figure 7:
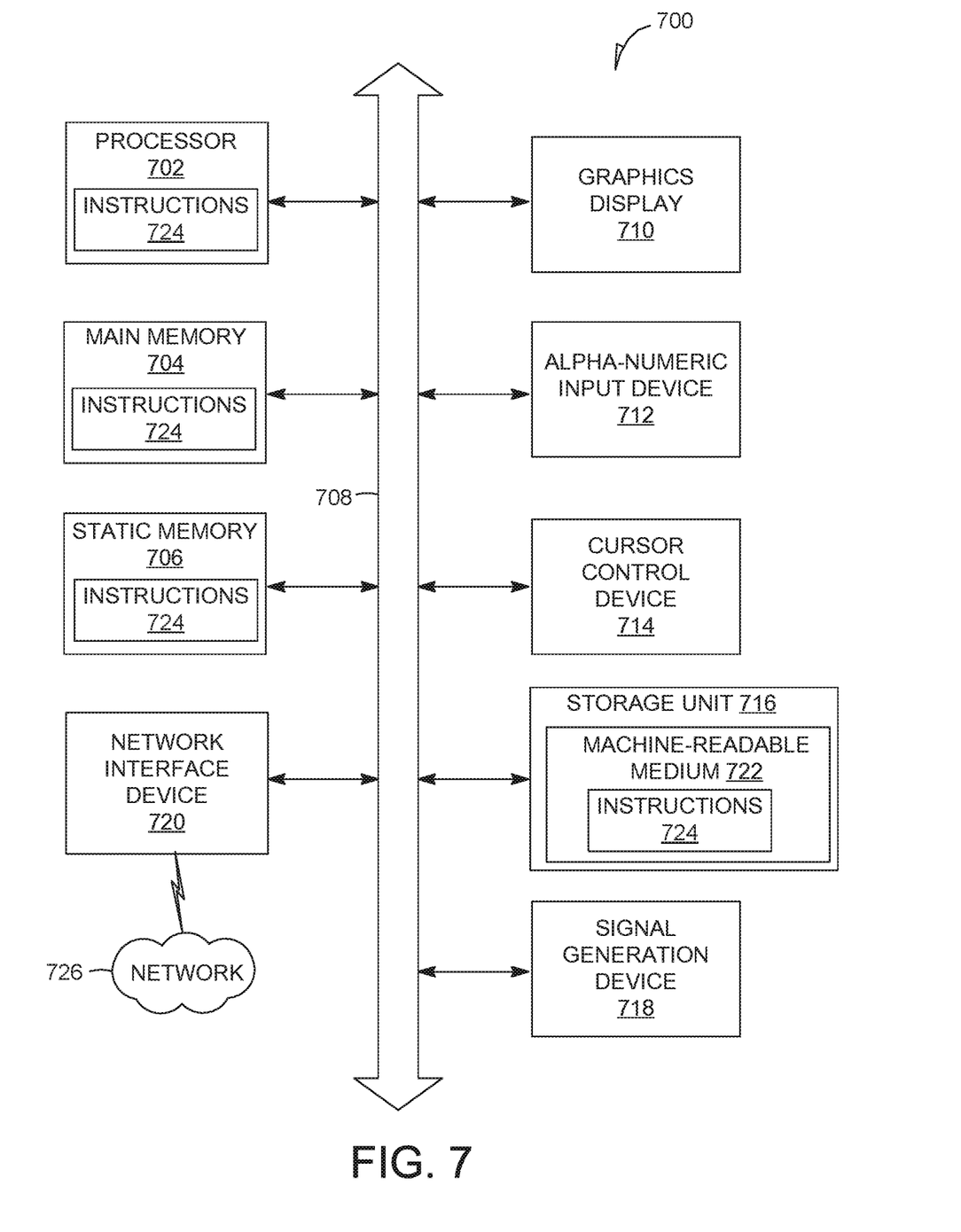
FIG. 7 is a simplified block diagram of a machine in an example form of a computing system within which a set of instructions for causing the machine to perform any one or more of the methodologies discussed herein may be executed.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system and within which instructions 724 (e.g., software, a program, an application, an applet, an app, or other executable code) for causing the machine 700 to perform any one or more of the methodologies discussed herein may be executed. In alternative embodiments, the machine 700 operates as a stand-alone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alpha-numeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (RUM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 700), such that the instructions (e.g., instructions 724), when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems e.g., a standalone computer system, a client computer system, or a server computer system) or one or more hardware modules of a computer system e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   receiving, by a secondary device, a management application that coordinates viewing of secondary content at the secondary device with primary content displayed at a primary device;
   detecting, by a detection module of the secondary device, identifying information of the primary content that is being presented on the primary device, the identifying information being captured by a hardware sensor of the secondary device;
   transmitting, by the secondary device to a content management system, a request for the secondary content, the request including the identifying information of the primary content;
   in response to the request, receiving, at the secondary device, the secondary content;
   verifying, using a hardware processor and by a verification module of the secondary device, whether the secondary content is in compliance with one or more consistency settings of the management application, the consistency setting indicating that the secondary content be either non-conflicting or complementary; and
   based on verifying that the secondary content is in compliance with the one or more consistency settings, displaying, by a presentation module of the secondary device, the secondary content on the secondary device.

2. The method of claim 1, wherein the detecting the identifying information comprises capturing, by the secondary device, a fingerprint of the primary content.

3. The method of claim 2, wherein the capturing the fingerprint of the primary content comprises capturing a visual fingerprint of the primary content that provides a visual characteristic of the primary content.

4. The method of claim 2, wherein the detecting the identifying information further comprises:
   accessing, by a content recognition module of the secondary device, a database of common content; and
   determining, by the content recognition module based on the accessed database, an identity of the primary content using the fingerprint by comparing the identifying information with content from the database to find a match.

5. The method of claim 2, wherein the detecting the identifying information further comprises:
   accessing a database of common content; and
   determining, from the database, a category of the primary content using the fingerprint, the identifying information comprising the category of the primary content.

6. The method of claim 1, further comprising based on the secondary content not being in compliance with one or more consistency settings, transmitting a request for a new secondary content.

7. The method of claim 1, wherein the one or more consistency settings of the management application are set by a user of the secondary device.

8. The method of claim 1, wherein the primary content is a primary advertisement and the secondary content is a secondary advertisement that is consistent with the primary advertisement.

9. The method of claim 1, wherein the primary content is a television show or movie and the secondary content is complementary material to the television show or movie.

10. The method of claim 9, wherein the complementary material comprises an advertisement for an item identified in the television show or movie.

11. The method of claim 1, wherein the primary content is identified based on an ad schedule.

12. A system comprising:
one or more hardware processors; and
a memory storing instructions that, when executed by the one or more hardware processors, causes the one or more hardware processors to perform operations comprising:
receiving, by a secondary device, a management application that coordinates viewing of secondary content at the secondary device with primary content displayed at a primary device;
detecting, by a detection module of the secondary device, identifying information of the primary content that is being presented on the primary device, the identifying information being captured by a hardware sensor of the secondary device;
transmitting, by the secondary device to a content management system, a request for the secondary content, the request including the identifying information of the primary content;
in response to the request, receiving, at the secondary device, the secondary content;
verifying, by a verification module of the secondary device, whether the secondary content is in compliance with one or more consistency settings of the management application, the consistency setting indicating that the secondary content be either non-conflicting or complementary; and
based on verifying that the secondary content is in compliance with the one or more consistency settings, displaying, by a presentation module of the secondary device, the secondary content on the secondary device.

13. The system of claim 12, wherein the detecting the identifying information comprises capturing, by the secondary device, a fingerprint of the primary content.

14. The system of claim 13, wherein the capturing the fingerprint of the primary content comprises capturing a visual fingerprint of the primary content that provides a visual characteristic of the primary content.

15. The system of claim 13, wherein the detecting the identifying information further comprises:
accessing, by a content recognition module of the secondary device, a database of common content; and
determining, by the content recognition module based on the accessed database, an identity of the primary content using the fingerprint by comparing the identifying information with content from the database to find a match.

16. The system of claim 13, wherein the detecting the identifying information further comprises:
accessing a database of common content; and
determining, from the database, a category of the primary content using the fingerprint, the identifying information comprising the category of the primary content.

17. The system of claim 12, wherein the operations further comprise based on the secondary content not being in compliance with one or more consistency settings, transmitting a request for a new secondary content.

18. The system of claim 12, wherein the one or more consistency settings of the management application are set by a user of the secondary device.

19. A non-transitory machine-readable medium storing instructions that, when executed by one or more processors of a machine, causes the machine to perform operations comprising:
receiving, by a secondary device, a management application that coordinates viewing of secondary content at the secondary device with primary content displayed at a primary device;
detecting, by a detection module of the secondary device, identifying information of the primary content that is being presented on the primary device, the identifying information being captured by a hardware sensor of the secondary device;
transmitting, by the secondary device to a content management system, a request for the secondary content, the request including the identifying information of the primary content;
in response to the request, receiving, at the secondary device, the secondary content;
verifying, by a verification module of the secondary device, whether the secondary content is in compliance with one or more consistency settings of the management application, the consistency setting indicating that the secondary content be either non-conflicting or complementary; and
based on verifying that the secondary content is in compliance with the one or more consistency settings, displaying, by a presentation module of the secondary device, the secondary content on the secondary device.

20. The non-transitory machine-readable medium of claim 19, wherein the receiving the management application by the secondary device comprises downloading the management application by the secondary device.

* * * * *